Sept. 4, 1951 C. B. NAGELMANN 2,566,625
LIGATING INSTRUMENT
Filed Aug. 24, 1950 2 Sheets-Sheet 1
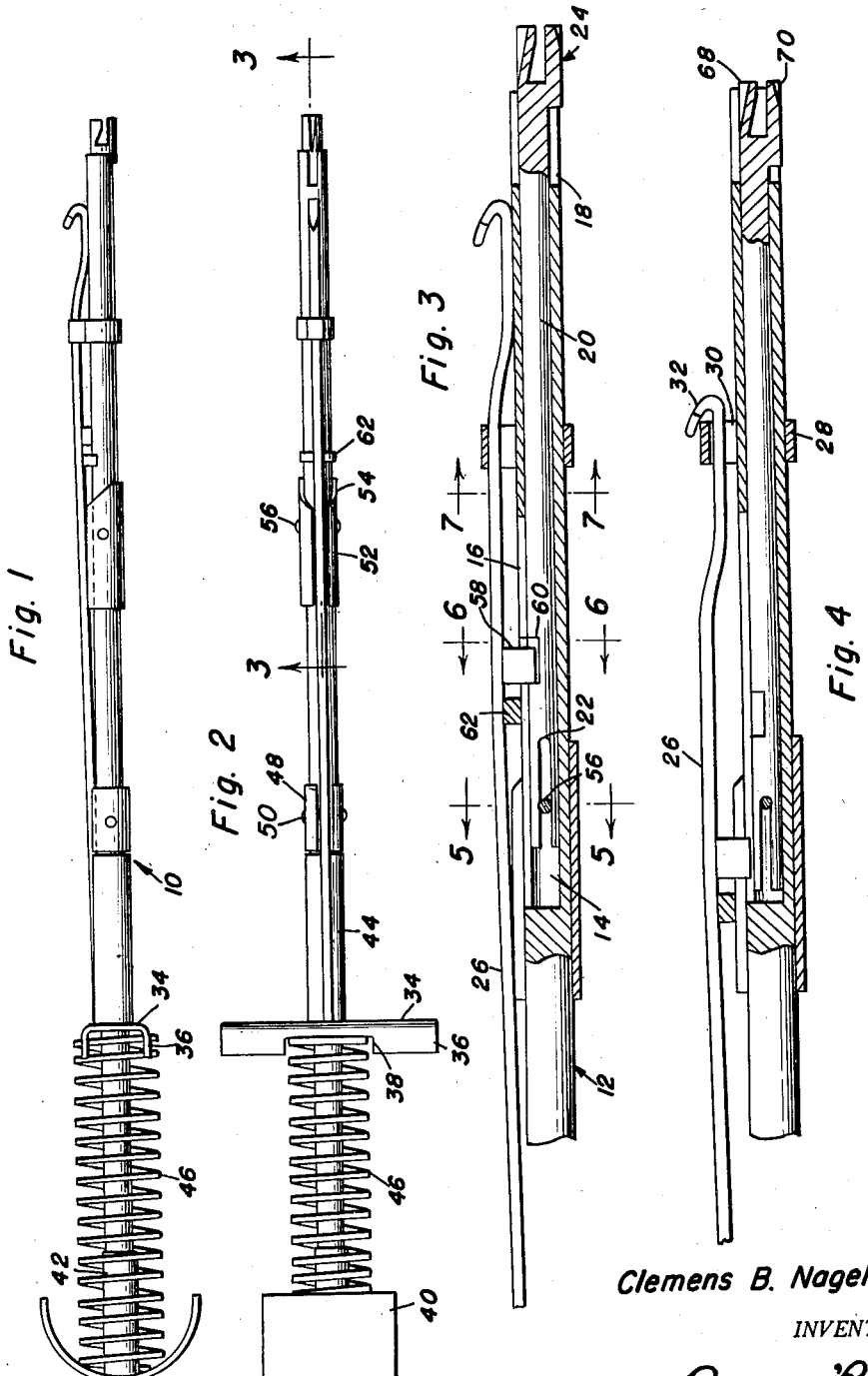
Clemens B. Nagelmann
INVENTOR.

Sept. 4, 1951 C. B. NAGELMANN 2,566,625
LIGATING INSTRUMENT
Filed Aug. 24, 1950 2 Sheets-Sheet 2
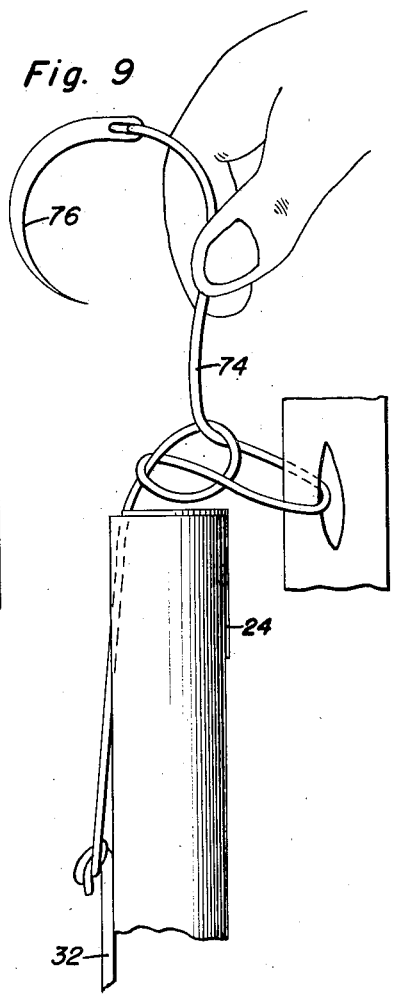
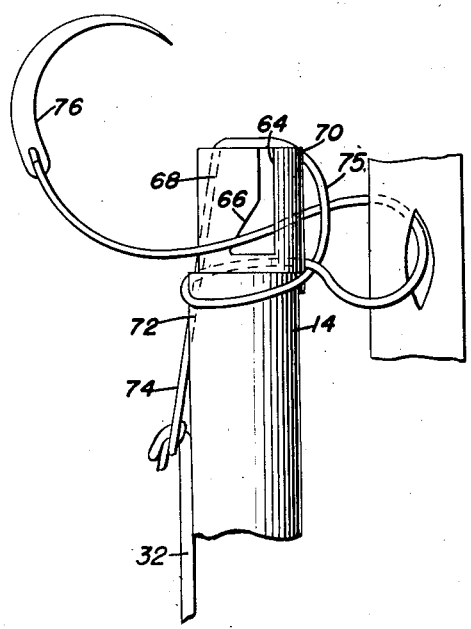
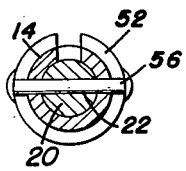
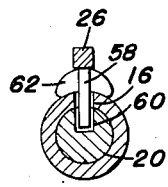
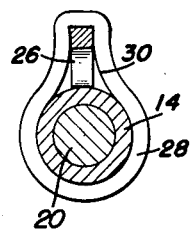
Clemes B. Nagelmann
INVENTOR.

Patented Sept. 4, 1951

2,566,625

UNITED STATES PATENT OFFICE 2,566,625

LIGATING INSTRUMENT

Clemens B. Nagelmann, Santa Barbara, Calif.

Application August 24, 1950, Serial No. 181,187

5 Claims. (Cl. 128—326)

The present invention relates to improvements in surgical instruments and more particularly to ligating instruments and constitutes an improvement over my Patent No. 1,933,024, patented October 31, 1933.

An object of this invention is to provide an effective and easily operated ligating instrument.

A further object of the present invention is to provide a surgical instrument for tying ligatures more expeditiously than has been heretofore possible in deep wounds, and in particular, this instrument facilitates ligating in abdominal and chest operations.

This invention also has for its objects to provide such means that are positive in operation, convenient in use, easily positioned for ligating in places normally difficult of access, economical of manufacture, and relatively simple.

This invention also comprises novel details of construction and novel combinations and arrangements of parts, which will more fully appear in the course of the following description. However, the drawings merely show and the following description merely describes an embodiment of the present invention which is given by way of illustration or example only.

Various other objects and advantages will be apparent from the detailed description to follow.

The best form in which I have contemplated applying my invention is illustrated in the accompanying drawings, in which:

Figure 1 is a side view of the entire instrument;

Figure 2 is a top view of the instrument shown in Figure 1;

Figure 3 is a vertical transverse sectional view taken substantially along line 3—3 of Figure 2;

Figure 4 is an enlarged view similar to Figure 3, but showing the hooking means in retracted position;

Figure 5 is a vertical cross-sectional view taken substantially along the line 5—5 of Figure 3;

Figure 6 is a vertical cross-sectional view taken substantially along the line 6—6 of Figure 3;

Figure 7 is a vertical cross-sectional view taken substantially along the line 7—7 of Figure 3;

Figure 8 is an enlarged detail view showing an end of the ligating instrument showing how the needle draws the thread into knot tying position; and Figure 9 is a view similar to Figure 8 but wherein the hooking means has been retracted tying the knot and forming a ligature for the torn tissue.

Looking more particularly to the drawings, wherein like numerals designate like parts throughout, numeral 10 designates generally the ligating instrument. 12 designates an elongated rod having a portion of its length hollowed as shown by numeral 14. The hollowed end of the rod 12 is formed with a first slot 16 at one end of the hollow portion 14 and a second slot 18 at the outer end of the hollowed portion of the elongated rod 12. Carried within the hollow portion 14 is a second rod 20 having a bifurcated end 22 at one end and an enlarged head 24 at its other end to be described hereinafter. Hooking means 26, formed of wire or rod stock, is held in juxtaposition to the rod by means of guide retainer 28, which is formed of a flat strip of metal bent around the hollowed portion of the rod and secured thereto leaving an opening 30 in which the hooking means reciprocates and is retained thereby. The hooking means 26 has an end 32 forming a hook to which the thread may be tied. The other end of the hooking means 26 is secured to finger member 34 at its center. Finger member 34 consists of an elongated U-shaped metallic member having its bent portions 36 provided with notches 38 for a purpose hereinafter described. The outer end of the solid part of the rod 12 is provided with a palm receiving member 40 consisting of a semi-circularly bent flat strip of metal having a tube 42 secured to its inner periphery receiving the end of the rod 12 therein, and secured in any desired fashion. The finger member 34 is slidingly received on the rod 12 by means of a tube 44 to which the finger member and hooking means are attached. Positioned between the finger member 34 and the palm receiving member 40 for resiliently urging the finger-receiving member to non-actuating position is a spring 46 received in the palm receiving element at one end and received in the notch 38 of the finger element at its other end. Second guide means 48 is provided for the hooking means and is secured to the rod by a pin 50.

Positioned between the first guide means 28 and the second guide means 48, is a camming means 52 having a pair of camming surfaces 54 and which is secured to the hollowed portion of the rod 12 by means of a pin 56 passing therethrough. It will be noted that the pin 56 is received in the bifurcation 22 for guiding the second rod 20 and limiting its retracted movement.

Secured to the hooking means at a point intermediate its length is a pin 58 received in a notch 60 in the second rod 20 for reciprocating the second rod in cooperation with the hooking means. Also, secured to the hooking means is a cam 62 which rides along the tubular portion of the rod 12 upon reciprocation of the hooking means and which in cooperation with the cam surfaces 54 raises the pin 58 out of the notch 60 upon a predetermined movement of the second rod 20.

As best seen in Figure 8, the head 24 is provided with a transverse slot 64 having an enlarged recess 66. In a plane perpendicular to that of the slot 64 are provided a pair of grooves 68 and 70. The end of the tubular portion 14 adjacent the head 24 is provided with a groove 72 in alignment with the groove 68.

Figure 5 best shows the pin 56 securing the camming means 52 to the tubular portion 14 and received in the bifurcation 22.

Figure 6 best shows the pin 58 secured to the hooking means 26 passing through the slot 16 into the notch 60 of the second rod 20 and the cam 62 secured to the hooking means 26.

Figure 7 best shows the guiding and retaining means 28 secured to the tubular portion 14 with the loop 30 through which the hooking means 26 passes.

The operation of the ligating instrument is as follows: One end of the thread 74 is tied to the hook 32, and with the needle 76 held in a holder and the ligating instrument held by the palm and finger receiving members, the thread 74 is positioned in the grooves 72 and 68 around the end of the head 24 into the groove 70, down around the end of the tubular portion 14 and that part of the thread 74 lying in the groove 72, and then between portion 75 of the thread and the head 24, through the tissue to be ligated, back around through the recess 66 and the thread is then in knot-tying position. The finger member 34 is then retracted against the resiliency of the spring 46 toward the palm receiving element 40 retracting the hook 32 with the thread 74 attached thereto. At the same time it will be seen that the second rod 20 will be reciprocated with the hooking means by means of the pin 58 passing through the slot 16 into the notch 60. As the second rod 20 is retracted into the tubular portion 14, the head 24 will similarly be retracted into the tubular portion. When the head 24 reaches the position shown in Figure 9, the cam 62 will ride up on the camming faces 54 disengaging the pin 58 from the notch 60 permitting the hooking means 26 to be further retracted without further movement of the second rod 20. In this respect it will also be seen that the pin 56 limits the inward movement of the second rod 20 upon striking the end of the bifurcation 22 and also holds the rod 20 with the notch 60 in cooperation with the slot 16. The continued retraction of the finger element 34 toward the palm receiving element 40 will now cause the knot to be tied inasmuch as the head 24 has been removed from interference.

At this point the thread may be cut at the desired points and the result is that which is known as the weaver's knot.

The ligating instrument of the present invention may be used not only for tying knots, but also as a combined ligating instrument and needle holder. The following is given by way of example. If the ligating is to be performed within the throat after a tonsilectomy, the needle is passed around the bleeding tissue by means of a conventional needle holder. Upon release of the needle from the holder in order to re-apply it to the portion of the needle that has penetrated the tissue, the needle would become lost from view because of the bleeding. To avoid losing the needle, a forceps is applied to the point of the needle before releasing the needle holder and while reapplying the needle holder to the portion of the needle passed through the tissue.

The ligating instrument may be effectively employed to eliminate the use of the forceps. When the needle is passed through the tissue, as above, it is at the same time passed through the slot or recess 66 at the enlarged portion. Inasmuch as the needle is of greater thickness than the transverse slot 64, retraction of the finger member 34 in opposition to the spring will cause the needle to be held by the instrument. When the conventional needle holder is released and reapplied to the needle point, the finger member 34 is partially released to free the needle and the needle holder may then be moved to pull the thread through the recess 66 choking the tissue against the instrument. Further pulling on the finger member 34 effects the ligating as hereinabove set forth.

Some changes may be made in the construction and arrangement of the parts of my device without departing from the real spirit and purpose of my invention, and it is my intention to cover by my claims any modified forms of structure or use of mechanical equivalents which may be reasonably included within their scope without sacrificing any of the advantages thereof.

Having described the invention, what is claimed as new is:

1. A ligating instrument comprising an elongated rod having a portion thereof hollow and forming a tube portion, a second rod in said tube portion having recess means at its outer end through which the needle can be passed, hooking means to which one end of the thread can be tied in juxtaposition with said elongated rod, groove means on said second rod at its outer end and in transverse relation to said recess means, means on said elongated rod for reciprocating said hooking means, and means on said hooking means for reciprocating said second rod in cooperation with said hooking means.

2. A ligating instrument comprising an elongated rod having a portion thereof hollow and forming a tube portion, a second rod in said tube portion having recess means at its outer end through which the needle can be passed, hooking means to which one end of the thread can be tied in juxtaposition with said elongated rod, groove means on said second rod at its outer end and in transverse relation to said recess means, means on said elongated rod for reciprocating said hooking means, and means on said hooking means for reciprocating said second rod in cooperation with said hooking means, and wherein said tube portion has a first slot at one end, a pin on said hooking means passing through said slot and engaging a recess in said second rod.

3. A ligating instrument comprising an elongated rod having a portion thereof hollow and forming a tube portion, a second rod in said tube portion having recess means at its outer end through which the needle can be passed, hooking means to which one end of the thread can be tied in juxtaposition with said elongated rod, groove means on said second rod at its outer end and in transverse relation to said recess means, means on said elongated rod for reciprocating said hooking means, and means on said hooking means for reciprocating said second rod in cooperation with said hooking means, and wherein said tube portion has a first slot at one end, a pin on said hooking means passing through said slot and engaging a recess in said second rod, and cam means on said elongated rod cooperating with said hooking means for lifting said pin from said recess when said hooking means has traversed a predetermined distance.

4. A ligating instrument comprising an elongated rod having a portion thereof hollow and forming a tube portion, a second rod in said tube portion having recess means at its outer end through which the needle can be passed, hooking means to which one end of the thread can be tied in juxtaposition with said elongated rod, groove means on said second rod at its outer end and in transverse relation to said recess means, means on said elongated rod for reciprocating said hooking means, and means on said hooking means for reciprocating said second rod in cooperation with said hooking means, said means on said elongated rod comprising a finger engaging member attached to one end of said hooking means, an arcuately curved element secured to the outer end of said elongated rod and adapted to fit in the palm of the hand, and resilient means between said member and element for urging said hooking means in one direction.

5. A ligating instrument comprising an elongated rod having a portion thereof hollow and forming a tube portion, a second rod in said tube portion having recess means at its outer end through which the needle can be passed, hooking means to which one end of the thread can be tied in juxtaposition with said elongated rod, groove means on said second rod at its outer end and in transverse relation to said recess means, means on said elongated rod for reciprocating said hooking means, and means on said hooking means for reciprocating said second rod in cooperation with said hooking means, a pin passing through said tubular portion, a slot in said second rod at the inner end cooperating with said pin for guiding and limiting movement of said second rod.

CLEMENS B. NAGELMANN.

No references cited.